United States Patent
Lee

(10) Patent No.: US 12,164,764 B2
(45) Date of Patent: Dec. 10, 2024

(54) TOUCH SENSITIVE PROCESSING APPARATUS, ELECTRONIC SYSTEM AND TOUCH SENSITIVE PROCESSING METHOD THEREOF

(71) Applicant: EGALAX_EMPIA TECHNOLOGY INC., Taipei (TW)

(72) Inventor: Hsiao-Tsung Lee, Taipei (TW)

(73) Assignee: EGALAX_EMPIA TECHNOLOGY INC., Taipei (TW)

(*) Notice: Subject to any disclaimer, the term of this patent is extended or adjusted under 35 U.S.C. 154(b) by 0 days.

(21) Appl. No.: 18/201,953

(22) Filed: May 25, 2023

(65) Prior Publication Data

US 2024/0069719 A1    Feb. 29, 2024

(30) Foreign Application Priority Data

Aug. 29, 2022   (TW) .................................. 111132445

(51) Int. Cl.
| | |
|---|---|
| G06F 3/04886 | (2022.01) |
| G06F 3/041 | (2006.01) |
| G06F 3/044 | (2006.01) |
| G06F 3/0481 | (2022.01) |

(52) U.S. Cl.
CPC ........ *G06F 3/04886* (2013.01); *G06F 3/0416* (2013.01); *G06F 3/0446* (2019.05); *G06F 3/0481* (2013.01)

(58) Field of Classification Search
CPC .. G06F 3/04886; G06F 3/0416; G06F 3/0446; G06F 3/0481; G06F 3/041; G06F 3/044
See application file for complete search history.

(56) References Cited

U.S. PATENT DOCUMENTS

| | | | |
|---|---|---|---|
| 8,395,594 B2 | 3/2013 | Karhiniemi | |
| 10,372,214 B1* | 8/2019 | Gleeson | G06F 3/0416 |
| 2008/0012835 A1* | 1/2008 | Rimon | G06F 3/04186 |
| | | | 345/173 |
| 2014/0210748 A1* | 7/2014 | Narita | G06F 3/041 |
| | | | 345/173 |
| 2016/0077616 A1* | 3/2016 | Durojaiye | G06F 3/04162 |
| | | | 345/173 |
| 2017/0185227 A1* | 6/2017 | Liao | G06F 3/04186 |
| 2018/0129335 A1* | 5/2018 | Stone | G06F 3/04162 |
| 2020/0117288 A1* | 4/2020 | Lopez | G06F 3/0362 |
| 2022/0197429 A1 | 6/2022 | Ho | |

FOREIGN PATENT DOCUMENTS

| | | |
|---|---|---|
| CN | 102047209 | 12/2013 |
| TW | 202225934 | 7/2022 |

\* cited by examiner

*Primary Examiner* — Md Saiful A Siddiqui
(74) *Attorney, Agent, or Firm* — WPAT, P.C

(57) ABSTRACT

According to one embodiment of the present application, a touch sensitive processing method is provided. The touch sensitive processing method, comprising: mutual capacitance sensing via touch electrodes of a touch panel to get one or more continuous images of the touch panel; calculating a center of circle corresponding to a knob placed on the touch panel according to the one or more continuous images; and when the center of circle is detected, setting up a rejection area corresponding to the center of circle.

22 Claims, 12 Drawing Sheets

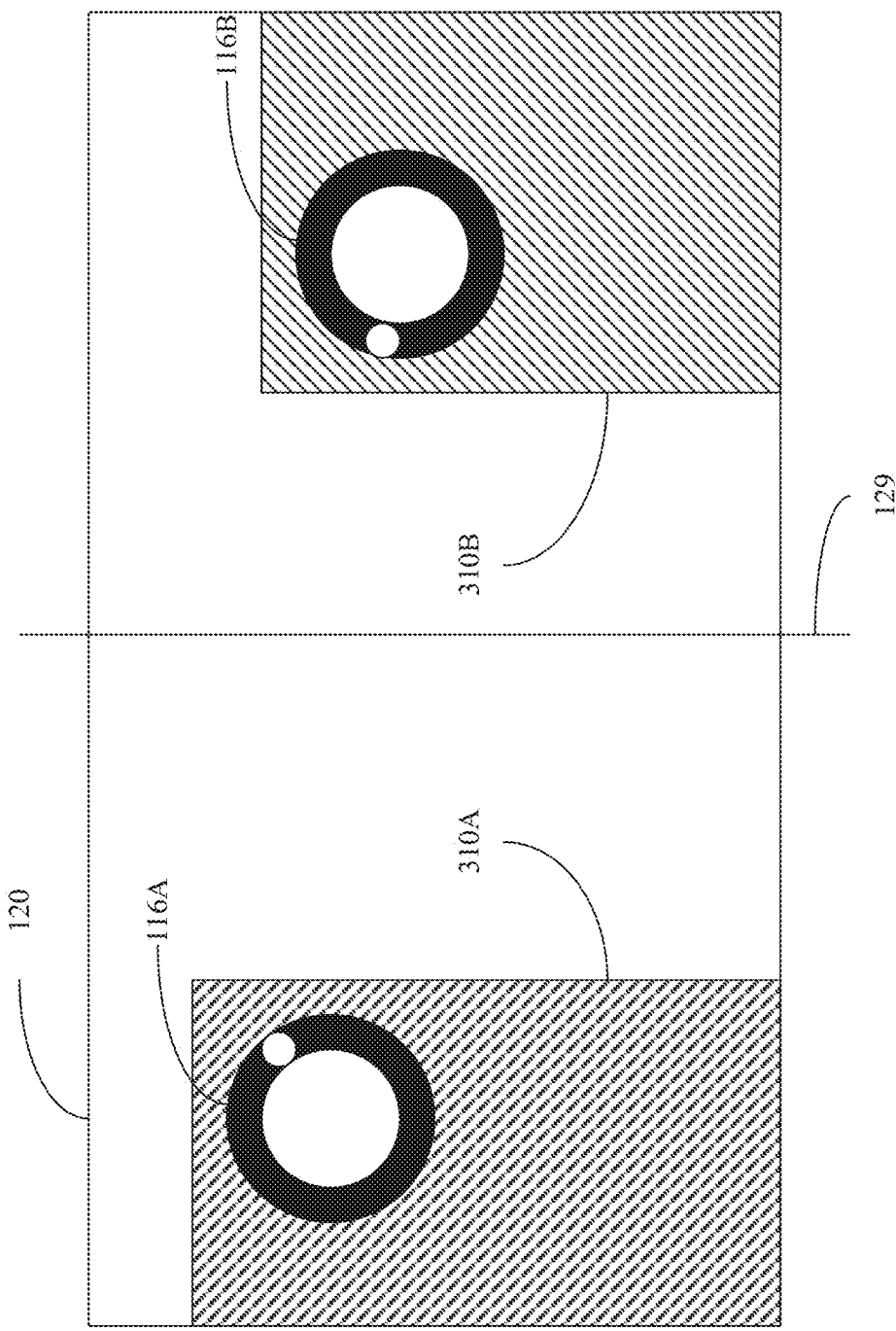

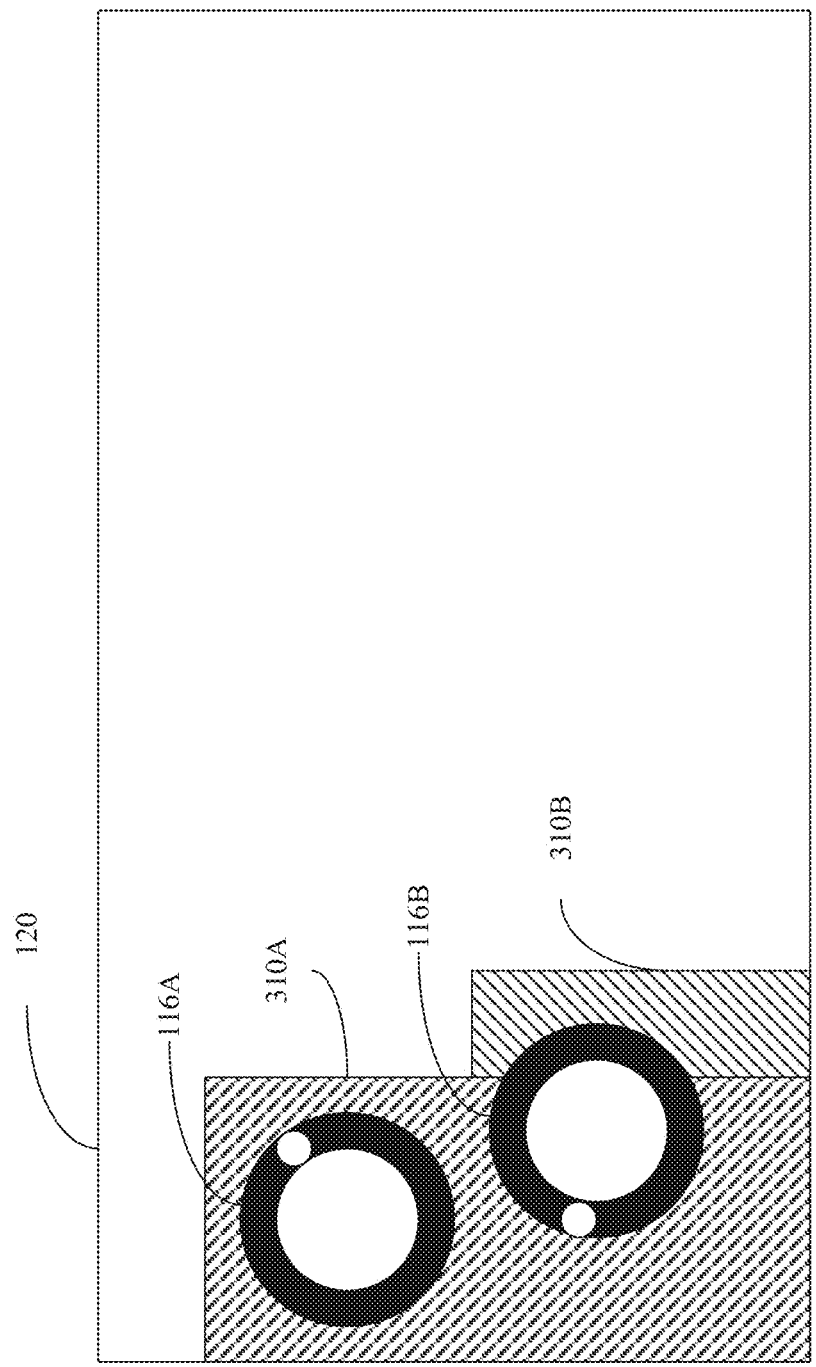

TOUCH SENSITIVE PROCESSING APPARATUS, ELECTRONIC SYSTEM AND TOUCH SENSITIVE PROCESSING METHOD THEREOF

CROSS REFERENCE TO RELATED PATENT APPLICATION

This patent application is based on a Taiwan, R.O.C. patent application No. 111132445 filed on Aug. 29, 2022.

FIELD OF THE INVENTION

The present invention relates to touch sensitive function, and more particularly, to set up a rejection area when a knob is placed on a touch screen.

BACKGROUND OF THE INVENTION

Touch panel or touch screen (hereinafter, they are collectively referred to touch screen) are common input apparatuses of modern electronic systems. Normally, the user can use fingers, styli, electronic board erasers to manipulate the touch screen. In order to conveniently adjust variances or parameters, a knob may be placed on the touch screen. User can rotate the knob to change indicating direction of the knob for controlling the variances or parameters corresponding to the knob.

However, when user controls the knob, a part of hand may touch the touch screen around the knob. If the touch sensitive processing apparatus controlling the touch screen does not have palm rejection function, unintentional touches would be inputted in. Hence there exists a need for quickly setting up a rejection area corresponding to the knob when it is placed on the touch screen so as that the user can manipulate freely the knob without triggering other unwanted functions.

SUMMARY OF THE INVENTION

According to the touch sensitive processing apparatus, the electronic system and method thereof provided by the present application, a rejection area corresponding to a knob can be quickly set up after the knob is placed on a touch panel or screen by a user such that the user can feel free to manipulate the knob by a hand and no unintentional functions would be triggered accidentally. Besides, the present application can be applied to a special designed or a normal knob.

According to an embodiment of the present application, a touch sensitive processing apparatus is provided. The touch sensitive processing apparatus comprising: an interconnection network configured for connecting multiple touch electrodes of a touch panel, respectively, wherein the touch electrodes include multiple first electrodes in parallel to a first axis and multiple second electrodes in parallel to a second axis; a driving circuit configured for emitting driving signals to one or more of the touch electrodes connected by the interconnection network; a sensing circuit configured for sensing one or more of the touch electrodes connected by the interconnection network; a processor, connected to the interconnection network, the driving circuit, and the sensing circuit, configured for executing instructions stored in a non-volatile memory for: mutual capacitance sensing, by the driving circuit and the sensing circuit, via the touch electrodes to get one or more continuous images of the touch panel; calculating a center of circle corresponding to a knob placed on the touch panel according to the one or more continuous images; and when the center of circle is detected, setting up a rejection area corresponding to the center of circle.

Preferably, in order to save computing resources and time corresponding to touching events, the processor is further configured for ignoring all kinds of approximating or touching events detected in the rejection area after the rejection area is set up.

Preferably, in order to specifically reject touching events related to hands in the rejection area, the processor is further configured for determining whether a touching event detected in the rejection area is related to a part of a hand after the rejection area is set up; and ignoring the touching event detected in the rejection area when the touching event is determined related to a part of a hand.

Preferably, in order to adapt to a knob with a button function, the rejection area does not include an area inside a circumference corresponding to the center of circle corresponding to the knob.

Preferably, in order to remove the rejection area after the knob leaves the touch panel, after the rejection area is set up, the processor is further configured for: mutual capacitance sensing, by the driving circuit and the sensing circuit, via the touch electrodes to get a second image of the touch panel; detecting a second touching event according to the second image, wherein the second touching event is on a circumference corresponding to the center of circle; when the second touching event is detected, maintaining the rejection area; and when the second touching event is not detected, removing the rejection area.

Preferably, in order to adapt to knobs have special arrangements of underlying external conductive materials for quickly setting up rejection areas, when the center of circle is calculated according to exact one of the images, wherein the exact one of the images includes multiple touching events corresponding to the knob, a position of the center of circle is calculated according to the multiple touching events corresponding to the knob.

Preferably, in order to deal with there are a plurality of knobs on the same touch panel or screen, the processor is further configured for: detecting a third touching event in each one of the continuous images; determining whether the third touching events in the continuous images are on a part of a circumference of another circle; and when the third touching events are determined on the part of the circumference of the another circle, setting up a third rejection area corresponding to a center of the another circle.

Preferably, the circle and the another circle are not overlapped.

Preferably, in order to adapt to multiple knobs of a common type on the same touch panel or screen, a radius of the circle is identical to a radius of the another circle.

Preferably, in order to removing the rejection area after the knob leaves the touch panel, the processor is further configured for following after the third rejection area is set: mutual capacitance sensing, by the driving circuit and the sensing circuit, via the touch electrodes to get a second image of the touch panel; detecting a second touching event in the second image, wherein the second touching event is on the circumference of the another circle; when the second touching event is detected, maintaining the third rejection area; and when the second touching event is not detected, removing the third rejection area.

Preferably, in order to adapt to the changed attitude that the user manipulates the knob in response to that the attitude of the touch panel relative to the ground, after the rejection area is set up, the processor is further configured for altering one of following characteristics of the rejection area according to an attitude of the touch panel relative to ground when it is notified that the attitude is changed: a size; a shape; and a position.

According to an embodiment of the present application, an electronic system is provided. The electronic system comprising the touch panel and the touch sensitive processing apparatus.

Preferably, in order to enhance user experience, the electronic system further comprises the knob.

According to one embodiment of the present application, a touch sensitive processing method is provided. The touch sensitive processing method, comprising: mutual capacitance sensing via touch electrodes of a touch panel to get one or more continuous images of the touch panel; calculating a center of circle corresponding to a knob placed on the touch panel according to the one or more continuous images; and when the center of circle is detected, setting up a rejection area corresponding to the center of circle.

Preferably, in order to save computing resources and time corresponding to touching events, the method further comprises ignoring all kinds of approximating or touching events detected in the rejection area after the rejection area is set up.

Preferably, in order to specifically reject touching events related to hands in the rejection area, the touch sensitive processing method further comprises: determining whether a touching event detected in the rejection area is related to a part of a hand after the rejection area is set up; and ignoring the touching event detected in the rejection area when the touching event is determined related to a part of a hand.

Preferably, in order to adapt to a knob with a button function, the rejection area does not include an area inside a circumference corresponding to the center of circle corresponding to the knob.

Preferably, in order to remove the rejection area after the knob leaves the touch panel, after the rejection area is set up, the touch sensitive processing method further comprises: mutual capacitance sensing via the touch electrodes to get a second image of the touch panel; detecting a second touching event according to the second image, wherein the second touching event is on a circumference corresponding to the center of circle; when the second touching event is detected, maintaining the rejection area; and when the second touching event is not detected, removing the rejection area.

Preferably, in order to adapt to knobs have special arrangements of underlying external conductive materials for quickly setting up rejection areas, when the center of circle is calculated according to exact one of the images, wherein the exact one of the images includes multiple touching events corresponding to the knob, a position of the center of circle is calculated according to the multiple touching events corresponding to the knob.

Preferably, in order to deal with there are a plurality of knobs on the same touch panel or screen, the touch sensitive processing method further comprises: detecting a third touching event in each one of the continuous images; determining whether the third touching events in the continuous images are on a part of a circumference of a second circle; and when the third touching events are determined on the part of the circumference of the second circle, setting up a third rejection area corresponding to a center of the second circle.

Preferably, the circle and the second circle are not overlapped.

Preferably, in order to adapt to multiple knobs of a common type on the same touch panel or screen, a radius of the circle is identical to a radius of the second circle.

Preferably, in order to removing the rejection area after the knob leaves the touch panel, the touch sensitive processing method further comprises following steps after the third rejection area is set: mutual capacitance sensing via the touch electrodes to get a second image of the touch panel; detecting a second touching event in the second image, wherein the second touching event is on the circumference of the another circle; when the second touching event is detected, maintaining the third rejection area; and when the second touching event is not detected, removing the third rejection area.

Preferably, in order to adapt to the changed attitude that the user manipulates the knob in response to that the attitude of the touch panel relative to the ground, after the rejection area is set up, the touch sensitive processing method further comprises altering one of following characteristics of the rejection area according to an attitude of the touch panel relative to ground when it is notified that the attitude is changed: a size; a shape; and a position.

BRIEF DESCRIPTION OF THE DRAWINGS

The advantages and spirit related to the present invention can be further understood via the following detailed description and drawings.

FIG. 4A depicts a diagram of knobs and corresponding rejection areas in accordance with an embodiment of the present application.

FIG. 4B depicts a diagram of a knob and a corresponding rejection area in accordance with an embodiment of the present application.

DETAILED DESCRIPTION OF THE PREFERRED EMBODIMENT

Figure 1:
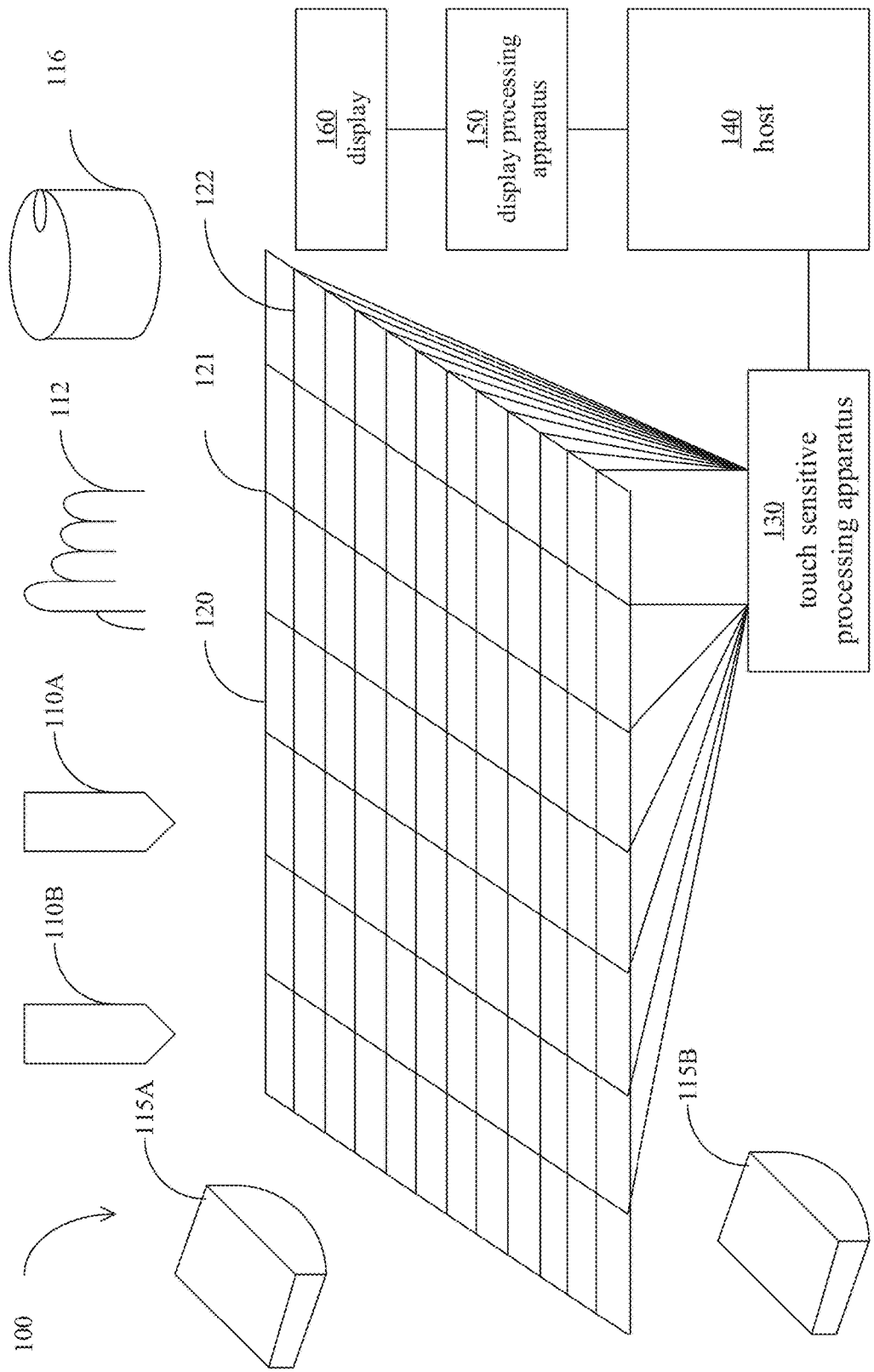
FIG. 1 depicts a diagram of an electronic system 100 in accordance with an embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which depicts a diagram of an electronic system 100 in accordance with an embodiment of the present invention. The electronic system 100 comprises a host 140 which includes devices, such as CPU, memory and interfaces for connecting peripheral input/output devices, for operating the electronic system 100. The interfaces may include industrial standard interfaces such as PCI, PCI-E, SATA, ATA, USB and UART and proprietary interfaces. The host 140 may connect to a display processing apparatus 150 via the interface. The display processing apparatus 150 is configured for connecting to a display 160 and for handling content shown on the display 160. The host 140 may connect to a touch sensitive processing apparatus 130 via the interface. The touch sensitive processing apparatus 130 is configured for connecting to a transparent touch panel having multiple touch electrodes and for detecting external conductive objects (e.g., hand 112, styli 110A and 110B, electronic board erasers 115A and 115B, and knob or dial 116) by the touch panel. The transparent touch panel 120 may comprise multiple first electrodes 121 in parallel to a first axis and multiple second electrodes 122 in parallel to a second axis. The transparent touch panel may directly be disposed on top of the display 160. Or the touch panel 120 may be integrated with a liquid crystal display 160 as an embedded touch panel. The present application does not limit how to combine the transparent touch panel 120 and the display 160. In one embodiment, the term touch screen 120 may be collectively referred to the touch panel 120 and the display 160.

The CPU of the host 140 may execute instructions and data stored in a non-volatile memory to run an operating system and application programs. The host 140 and the display processing apparatus 150 may follow instructions of the operating system and the application programs unilaterally or jointly control contents shown on the display 160 or the touch screen 120. In the present application, display content may be controlled by the host 140. When the host 140 runs some application programs, a drawing area would be shown on the touch screen 120. When the stylus 110A or 110B inputs in the drawing area, stroke traces corresponding to the stylus 110A or 110B would be shown in the drawing area. The display contents corresponding to the stroke traces are changed according to the inputs of the stylus 110A or 110B. Similarly, when the electronic board erasers 115A or 115B inputs in the drawing area, erasing areas corresponding to the electronic board erasers 115A or 115B would be shown in the drawing area. The display contents corresponding to the erasing areas are changed according to the inputs of the electronic board erasers 115A or 115B.

Figure 2:
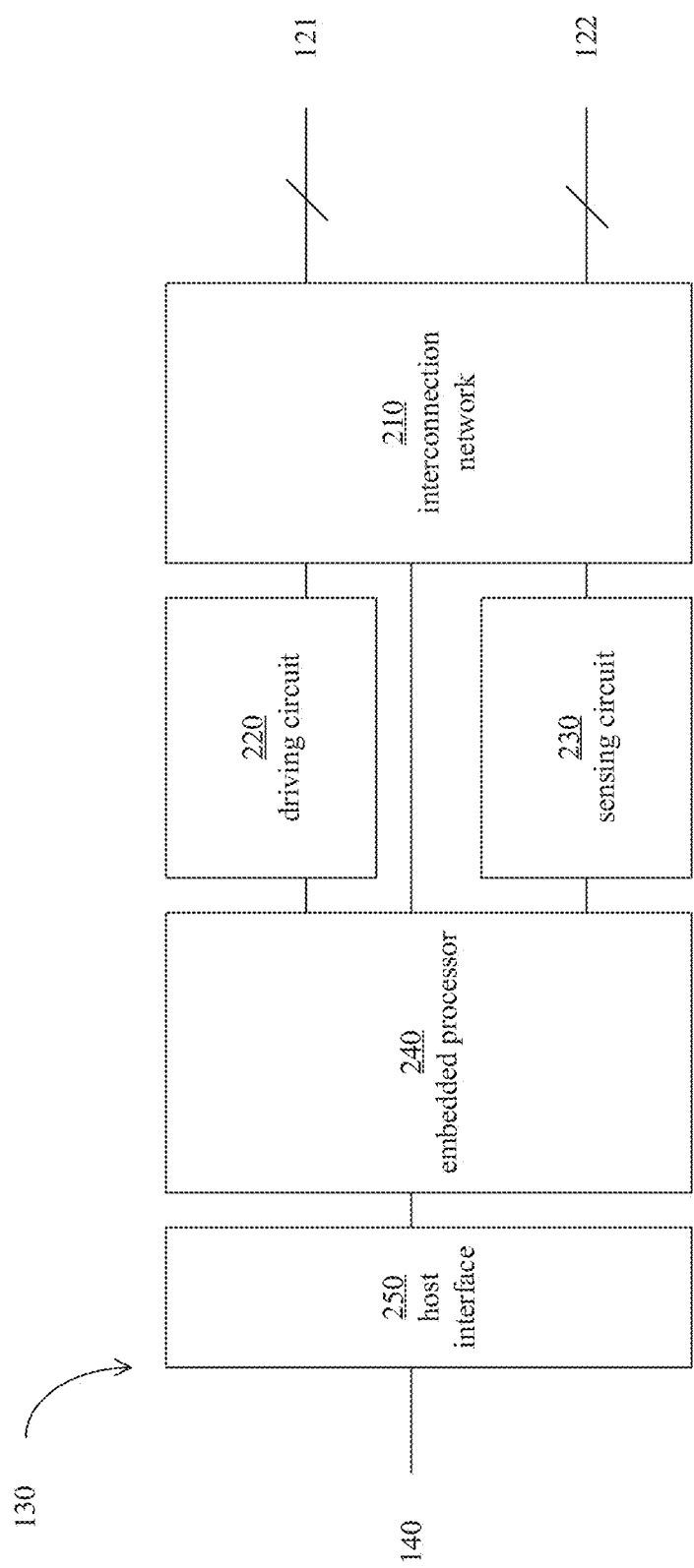
FIG. 2 depicts a block diagram of a touch sensitive processing apparatus 130 in accordance with an embodiment of the present application.

Please refer to FIG. 2, which depicts a block diagram of a touch sensitive processing apparatus 130 in accordance with an embodiment of the present application. The touch sensitive processing apparatus 130 comprises an embedded processor 240 for connecting and controlling an interconnection network 210, a driving circuit 220, a sensing circuit 230 and a host interface 250. The driving circuit 220 may connects to each of the first electrodes 121 and the second electrodes 122 via the interconnection network 210 for emitting driving signals simultaneously or in a time-sharing manner via these electrodes. The sensing circuit 230 may connects to each of the first electrodes 121 and the second electrodes 122 via the interconnection network 210 for sensing simultaneously or in a time-sharing manner via these electrodes. According to mutual-capacitance sensing principle, each intersection of one of the first electrodes 121 and one of the second electrodes is corresponding to a sensing signal. The sensing circuit 230 can generate sensing information corresponding to the sensing signal corresponding to each of the intersection to generate a two-dimensional sensing information array or a sensing image corresponding to the touch screen 120. The embedded processor 240 can communicate with the host 140 via the host interface 250. The embedded processor 240 can execute procedural modules stored in a non-volatile memory to detect an object and an event approximating or touching the touch screen according to the sensing image.

Person having ordinary skill in the art can understand that the touch sensitive processing apparatus 130 can find out a position corresponding to an external conductive object with respect to the touch screen 120 by utilizing self-capacitance and/or mutual-capacitance principles via the touch electrodes of the touch screen 120. The knob 116 referred by the present application is a kind of the external conductive objects. When the user holds the knob 116 placed on the touch screen 120, a part of energy of the driving signals emitted via the touch electrode by the driving circuit 220 of the touch sensitive processing apparatus would pass to outside ground via the knob 116 and the user's body. It does not return to the sensing circuit 230 of the touch sensitive processing apparatus 130 via another touch electrode. Hence, the embedded processor 240 of the touch sensitive processing apparatus 130 can calculate the measured variation to determine a position of the knob 116 with respect to the touch screen 120.

In the embodiments of the present application, as a passive external conductive object, the knob 116 may not actively transmit electrical signals or electric energy to cause the capacitance variation. The knob 116 may be a cylinder or a hollow cylinder. A conductive material may be arranged at a point of a circumference of a lower surface of the cylinder. Rest of the circumference may be made by non-conductive material. The touch sensitive processing apparatus 130 can detect a designated position of the conductive material of the knob according to the self-capacitance and/or mutual-capacitance principles. When the knob 116 is rotated by the user, the designated position of the knob would be moved along the circumference.

When the knob 116 is placed on the touch screen 120, the conductive material would approximate or touch the touch screen 120. However, the touch sensitive processing apparatus 130 cannot tell differences between the conductive material of the knob 116 and other external conductive objects. In other words, the touch sensitive processing apparatus 130 has no clues to tell what the detected is the conductive material of the knob 116, a finger 112 or a stylus 111A. However, when the touch sensitive processing apparatus 130 is aware that an external conductive object belongs to the knob 116, it may calculate messages such as a position of a center of circle of the knob 116, a radius of the knob 116 (i.e., a distance between the position of the center and the designated position), an angle of the designated position with respect to the center of circle, a rotational angle, an angular speed of rotation, an angular acceleration of rotation etc. The present application would provide methods for identifying the knob 116 among external conductive objects later.

In one embodiment of the present application, in case that the touch sensitive processing apparatus 130 is aware that an external conductive object is a knob 116, one or more rejection areas can be set up according to the position of the knob 116. The touch sensitive processing apparatus 130 may apply rules different to other kinds of areas to exclude approximating or touching events corresponding to fingers, palms and/or arms in the one or more rejection areas. In one embodiment of the present application, the touch sensitive processing apparatus 130 may not exclude approximating or touching events outside the rejection areas.

Figure 3A:
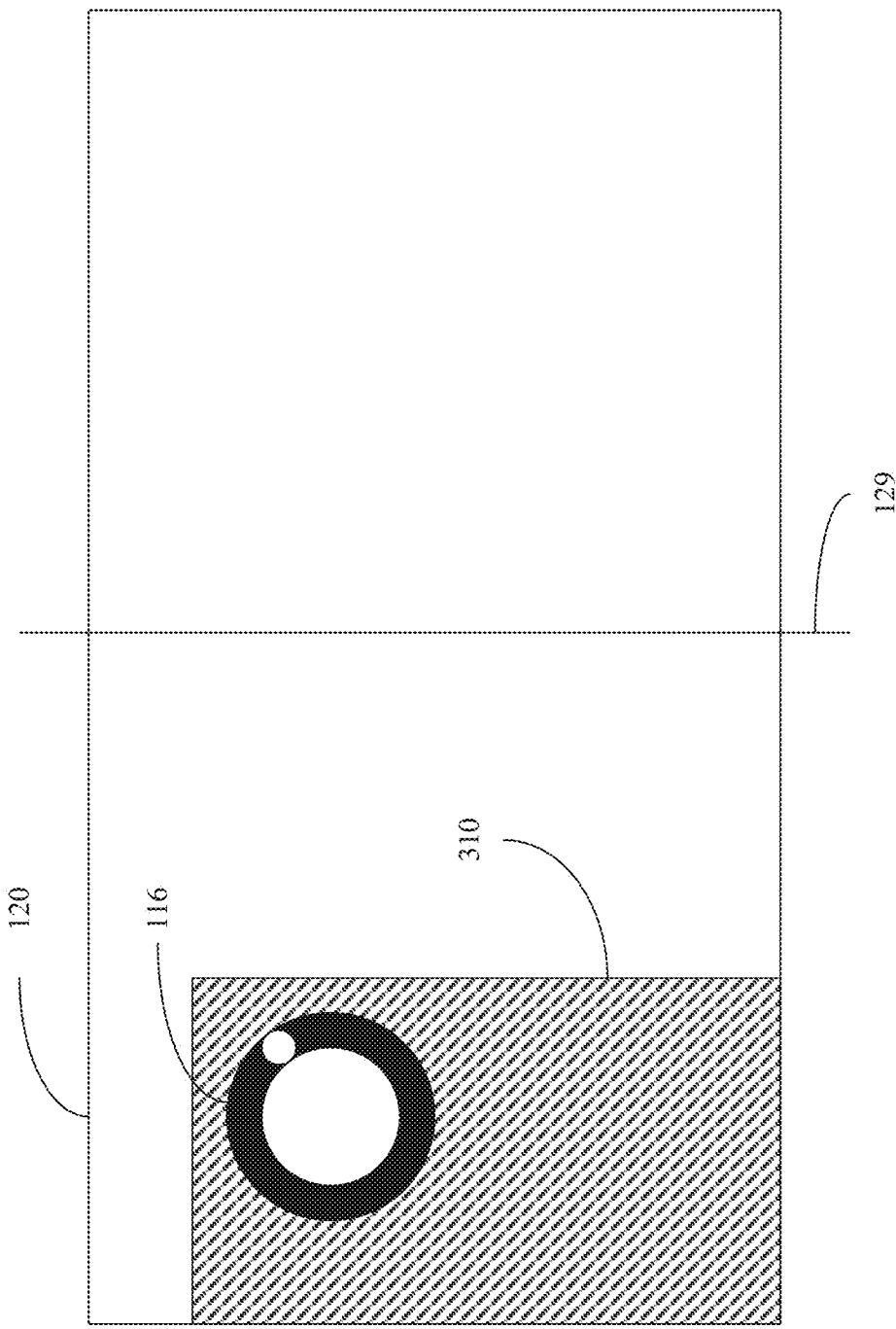
FIG. 3A depicts a diagram of a knob and a corresponding rejection area in accordance with an embodiment of the present application.

Please refer to FIG. 3A, which depicts a diagram of a knob and a corresponding rejection area in accordance with an embodiment of the present application. As shown in FIG. 3A, a knob 116 is placed at left side of the surface of the touch screen 120. In other words, the touch sensitive processing apparatus 130 may determine that the approximating or touching position of the knob 116 is at the left side or a first side of the middle line 129. Hence, the touch sensitive processing apparatus 130 set an area corresponding to the approximating or touching position of the knob 116 as a rejection area 310.

Normally, the shape of the touch screen 120 is a rectangle. An edge of the rectangle is closest to user's body. In the present application, it is referred as the lower edge. An edge at the left side of the user is referred as the left edge. An upper edge and a right edge are opposite to the lower edge and the left edge, respectively. In the embodiment as shown in FIG. 3A, the rejection area 310 includes the lower and the left edges of the touch screen 120 and a projection area of the knob 116 on the touch screen 120. When the touch screen 120 is placed in parallel or approximately in parallel to the ground surface, the user may manipulate the knob 116 with his left arm pressing on the touch screen 120. Thus, the rejection area 310 can be used to exclude approximating or touching events corresponding to the left arm, wrist, palm and fingers.

Because the execution of rejection methods of approximating or touching events requires additional computing resources of the touch sensitive processing apparatus 130, it does not need to set the whole touch screen 120 as a rejection area 310. Especially when the touch sensitive processing apparatus 130 may need to detect other kinds of approximating or touching events in the rejection areas 310, such as detecting one or more styli 111A and 111B, one or more electronic board erasers 115A and 115B. Shrinking more of the rejection areas can save consumed computing resources and electric powers. However, if no rejection area 310 set up according to the position of the knob 116, the approximating or touching events corresponding to the left arm, wrist, palm and fingers may cause many unintentional touches which cause disturbances and troubles.

Figure 3B:
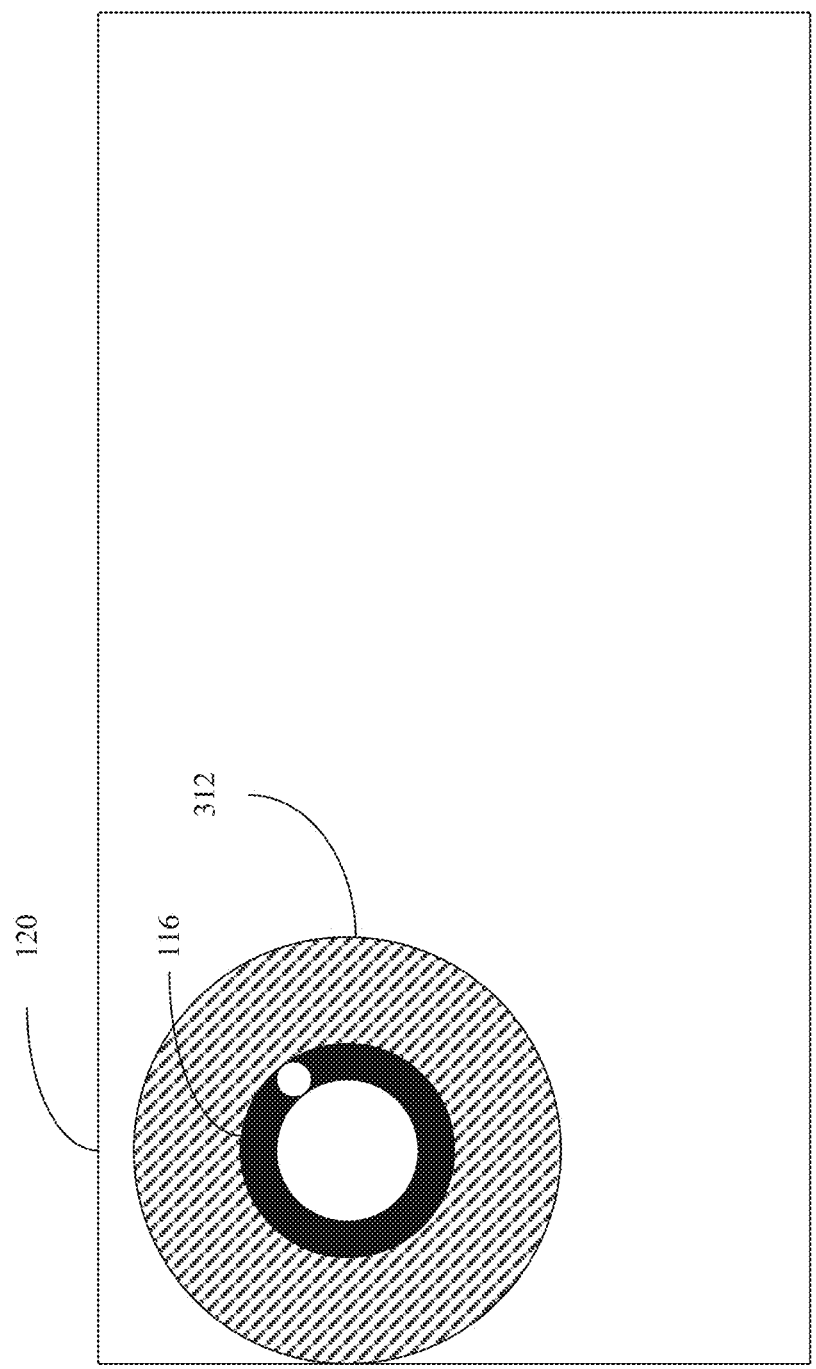
FIG. 3B depicts a diagram of a knob and a corresponding rejection area in accordance with an embodiment of the present application.

Please refer to FIG. 3B, which depicts a diagram of a knob and a corresponding rejection area in accordance with an embodiment of the present application. Like the embodiment as shown in FIG. 3A, a knob 116 is also placed on the left side of the surface of the touch screen 120 as shown in FIG. 3B. When the touch screen 120 is placed vertical to the ground or almost vertical to the ground, it is quite unlikely that the user manipulates the knob 116 with his left arm pressing on the touch screen 120. It is more likely that the user touches the touch screens with his fingers, palm and/or wrist. Hence, the rejection area 312 as shown in FIG. 3B is set up according to a central position of circle corresponding to the knob 116. In one embodiment, the rejection area 312 may be a concentric circle share a common center of the knob 116. In another embodiment, the rejection area 312 may be a circle or an ellipse which includes the projection area of the knob 116 on the touch screen 120. The center of the circle corresponding to the knob 116 may be at one of two focuses of the ellipse. In other embodiments, the rejection area 312 may be a polygon or a regular polygon which includes the projection area of the knob 116 on the touch screen 120.

Figure 3C:
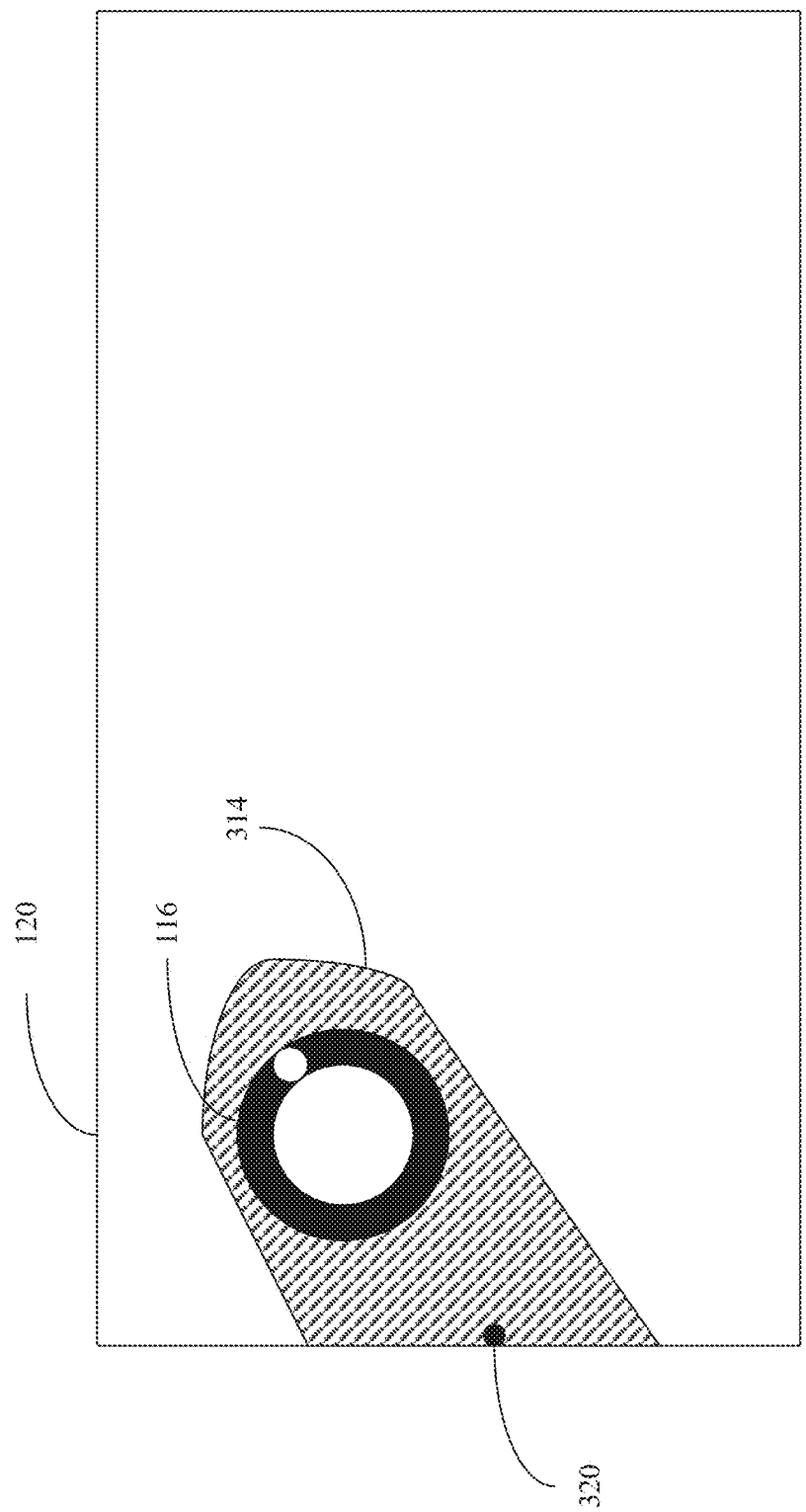
FIG. 3C depicts a diagram of a knob and a corresponding rejection area in accordance with an embodiment of the present application.

Please refer to FIG. 3C, which depicts a diagram of a knob and a corresponding rejection area in accordance with an embodiment of the present application. Like the embodiments as shown in FIGS. 3A and 3B, a knob 116 is also placed on the left side of the surface of the touch screen 120 as shown in FIG. 3C. In the embodiment as shown in FIG. 3C, the touch sensitive processing apparatus 130 detects one or more approximating or touching events 320 near the left edge of the touch screen 120. When a approximating or touching event 320 sustains a longer time period and its position does not move frequently, the touch sensitive processing apparatus 130 may determine that the approximating or touching events 320 are corresponding to a left arm which manipulates the knob 116. Hence, the touch sensitive processing apparatus 130 may set up a rejection area 314 corresponding to the center of the circle with regard to the knob 116 and the approximating or touching event 320. As shown in FIG. 3C, the area of the rejection area 314 is smaller than the rejection areas 310 and 312. Hence, it save computing power, time and energy of the touch sensitive processing apparatus 130 for rejecting the approximating or touching events related to the arm of palm.

In one embodiment of the present application, the electronic system 100 may comprise apparatuses for detecting attitudes, such as accelerometer, angular accelerometer, and gyro etc. The apparatus for detecting attitude may directly connects to the touch sensitive processing apparatus 130 for notifying attitude changes of the electronic system 100. In other embodiments, the apparatus for detecting attitude may report to the host 140 for notifying attitude changes of the electronic system 100. The touch sensitive processing apparatus 130 may be aware of the attitude changes of the electronic system 100 via the host 140.

In one embodiment of the present application, when the electronic system 100 detects attitude changes to the touch screen 120, the touch sensitive processing apparatus 130 may be notified. For example, the rejection area 310 is initially set up by the touch sensitive processing apparatus 130 at the beginning because the touch screen 120 is placed near horizontally. When being notified that the attitude of the touch screen 120 is changed to near vertically, the touch sensitive processing apparatus 130 may reset the rejection area 310 to the rejection area 312 and vice versa.

In one embodiment of the present application, when being notified that the lower edge of the touch screen 120 is switched to another edge, the touch sensitive processing apparatus 130 may reconfigure the position and the size of the rejection area according to the rules.

In one embodiment of the present application, when the touch sensitive processing apparatus 130 detects one or more approximating or touching events 320 at or near the edge, it may reset the rejection area 310 or 312 to the rejection area 314. Contrary, when the touch sensitive processing apparatus 130 does not detect any approximating or touching events 320, it may reset the rejection area 314 to the rejection area 310 or 312.

Please refer to FIG. 4A, which depicts a diagram of knobs and corresponding rejection areas in accordance with an embodiment of the present application. As shown in FIG. 4A, a knob 116A is placed on the left side of the surface of the touch screen 120. In other words, the touch sensitive processing apparatus 130 may determine that the approximating or touching position corresponding to the knob 116A is at the left side or the first side of the middle line 129. Consequently, the touch sensitive processing apparatus 130 may set up a rejection area 310A corresponding to the approximating or touching position corresponding to the knob 116A.

Similarly, as shown in FIG. 4A, a knob 116B is placed at the upper right side of the touch screen 120. In other words, the touch sensitive processing apparatus 130 can determine that an approximating or touching position of the knob 116B is at the right side or the second side of the middle line 129. Hence, the touch sensitive processing apparatus 130 may set up a rejection area 310B corresponding to the approximating or touching position corresponding to the knob 116B.

Both the rejection areas 310A and 310B touch the lower edge of the touch screen 120. They touch the left and the right edges of the touch screen 120, respectively. Multiple knobs 116 may be placed on the touch screen 120, such as the knobs 116A and 116B as shown in FIG. 4A which are supposed to be manipulated by the left and the right hands of the user. Therefore, the touch sensitive processing apparatus 130 can set up a rejection area for each of the knobs 116 according to their positions, respectively. The present application does not limit the number of the rejection areas.

Please refer to FIG. 4B, which depicts a diagram of a knob and a corresponding rejection area in accordance with an embodiment of the present application. As shown in FIG. 4B, a knob 116A is placed on the left side of the surface of the touch screen 120. In other words, the touch sensitive processing apparatus 130 may determine that the approximating or touching position corresponding to the knob 116A is at the left side or the first side of the middle line 129. Consequently, the touch sensitive processing apparatus 130 may set up a rejection area 310A corresponding to the approximating or touching position corresponding to the knob 116A.

Similarly, as shown in FIG. 4B, a knob 116B is placed at the upper right side of the touch screen 120. In other words, the touch sensitive processing apparatus 130 can determine that an approximating or touching position of the knob 116B is at the right side or the second side of the middle line 129. Hence, the touch sensitive processing apparatus 130 may set up a rejection area 310B corresponding to the approximating or touching position corresponding to the knob 116B.

In this embodiment, there is a common area resides in both the rejection area 310A and the rejection area 310B. In other words, an intersection of the rejection areas 310A and 310B is not an empty set. Hence, the touch sensitive processing apparatus 130 may set up a rejection area as a union of the rejection areas 310A and 310B.

In one embodiment of the present application, the rejection area 310 includes a projection area of the knob 116 on the touch screen 120, but the touch sensitive processing apparatus 130 may not reject the designated position of the knob 116. In other embodiments, there may exist one or more buttons inside the circumference of the knob 116. When the button is not being pressed, the touch sensitive processing apparatus 130 would not detect an approximating or touching event corresponding to the button. However, when the button is being pressed, the touch sensitive processing apparatus 130 is able to detect an approximating or touching event corresponding to the button and report this event to the host 140. Because the structure of the knob 116 prevents any other external conductive object causing an approximating or touching event in the projection area on the touch screen 120, the rejection area 310 may not include the projection area of the knob 116 on the touch screen 120.

Figure 5:
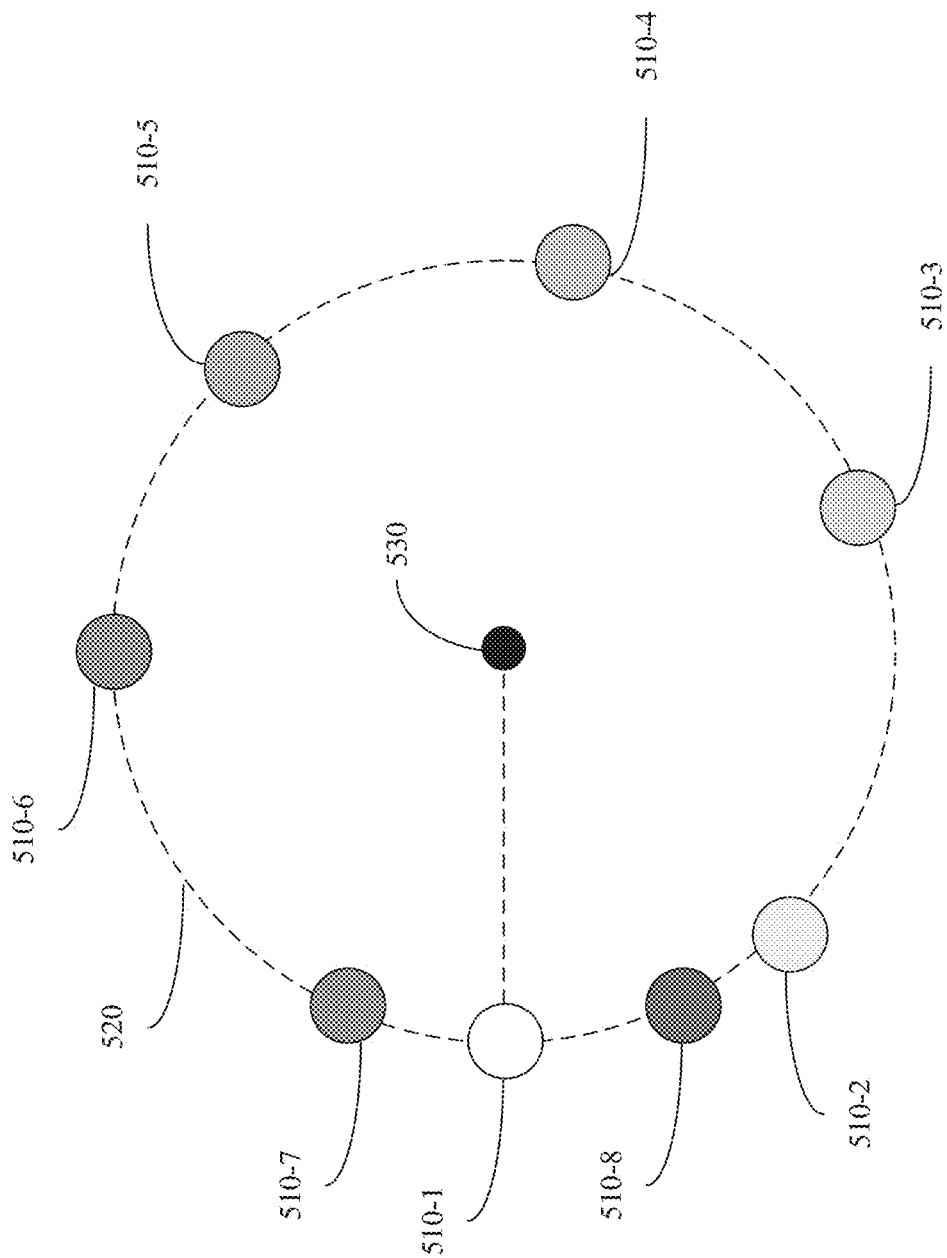
FIG. 5 depicts a diagram of multiple designated positions of a knob in accordance with an embodiment of the present application.

When the touch sensitive processing apparatus 130 continuously performs multiple detections on the touch screen 120, traces of approximating or touching events corresponding to external conductive objects can be gathered. Please refer to FIG. 5, which depicts a diagram of multiple designated positions of a knob in accordance with an embodiment of the present application. When the user rotates the knob, the corresponding designated positions are positions 510-1 through 510-8 as shown in FIG. 5. These designated positions 510 can form a circular trace 520.

When the touch sensitive processing apparatus 130 detects the circular trace 520, it can determine where a center 530 of the circle is. Next, based on abovementioned embodiments, a rejection area is set up according to the center 530 of the circle.

In one embodiment, when the user wants to place the knob 116 on the touch screen 120, the user may notify the touch sensitive processing apparatus 130 via the operating system run by the host 140. Subsequently, the touch sensitive processing apparatus 130 begins to determine whether a newly appeared trace of approximating or touching events is a part of a circumference after the notification. In one variant of the embodiment, the touch sensitive processing apparatus 130 does not need to wait until the designated position 510-8 to associate the designated positions to the knob 116. It may determine the trace is corresponding to the knob 116 until the designated position 510-5 is detected, i.e., a half of circumference is shown. After the center of the circle of the knob is determined, the touch sensitive processing apparatus 130 may stop determining whether a trace of newly appeared approximating or touching events is corresponding to the knob 116 in order to save computing resources.

In another embodiment, the operating system or the application run by the host 140 may designate a knob placing area at will and the touch sensitive processing apparatus 130 may not be notified about the knob placing area. When the knob 116 is placed at a position inside the knob placing area, the touch sensitive processing apparatus 130 reports a corresponding designated position to the host 140. The operating system or the application can ignore this approximating or touching event because the reported designated position resides in the knob placing area. After the user rotates the knob 116, the touch sensitive processing apparatus 130 subsequently determines that a trace of the designated positions is corresponding to the knob 116. The touch sensitive processing apparatus 130 may report to the host 140 about the center of the circle corresponding to the knob 116, a radius of the knob 116 (i.e., a distance between the center of the circle and the designated position), an indicating angle of the designated position, a rotated angle, an angular speed of rotation, and an angular acceleration of rotation etc. Besides, the touch sensitive processing apparatus 130 can set up a corresponding rejection area.

In order to let the touch sensitive processing apparatus 130 recognizes approximating or touching events related to the knob 116, the bottom surface of the knob 116 may further comprise other multiple external conductive materials in addition to abovementioned one. The additional multiple external conductive materials may be arranged at another circumference inside the knob 116. The touch sensitive processing apparatus 130 may be aware the relative positions and distance between the additional multiple external conductive materials in advanced. Thus, the touch sensitive processing apparatus 130 may determine where the center of circle corresponding to the knob 116 is according to the relative positions and distances between the approximating or touching events corresponding to the additional multiple external conductive materials.

Figure 6A:
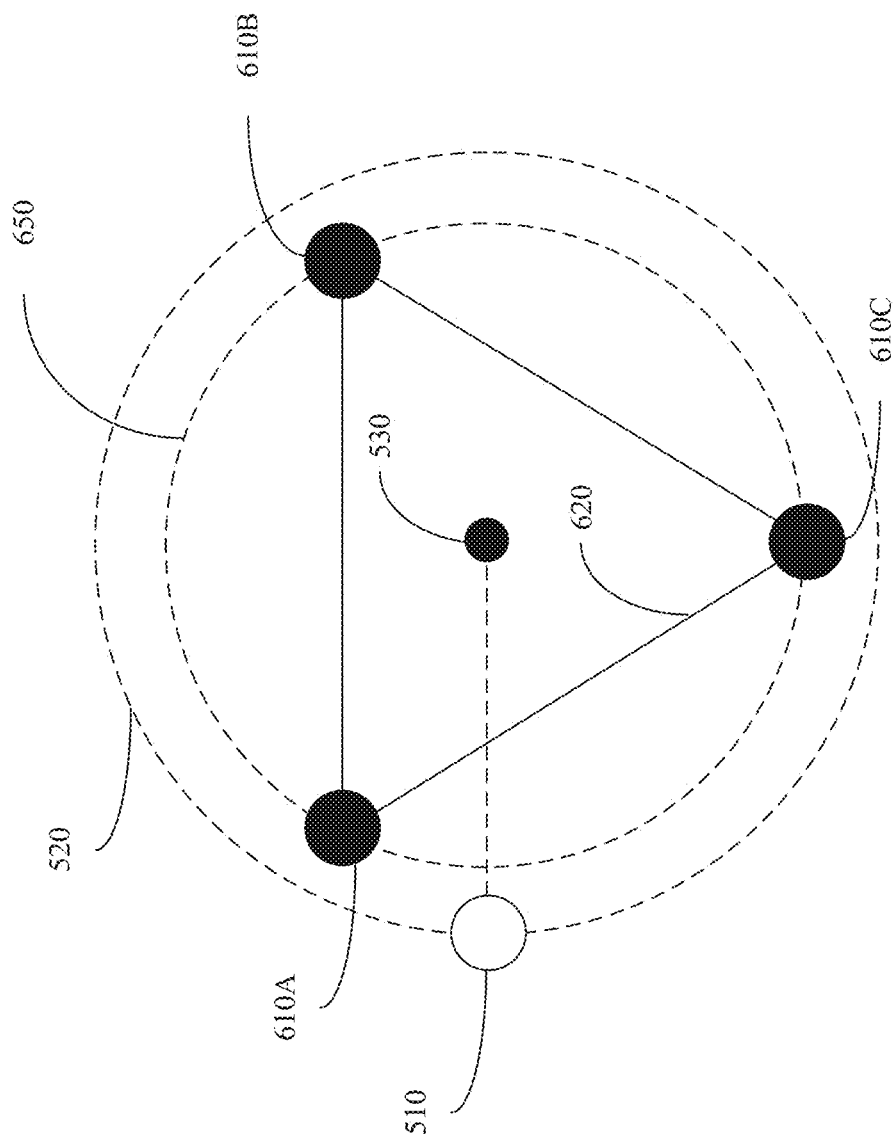
FIG. 6A depicts a diagram of multiple external conductive materials at a bottom surface of a knob in accordance with an embodiment of the present application.

Please refer to FIG. 6A, which depicts a diagram of multiple external conductive materials at a bottom surface of a knob in accordance with an embodiment of the present application. As shown in FIG. 6A, there are three external conductive materials 610A, 610B and 610C at the bottom surface of the knob 116. These three external conductive materials are at a circumference 650 of another circle. And they form an equilateral triangle. The circumferences 650 and 620 are corresponding to different radiuses, respectively. However, they share a common center 530 of the circles.

When the touch sensitive processing apparatus 130 performs detections via the touch screen 120, four approximating or touching events respectively corresponding to the external conductive materials 510, 610A, 610B and 610C would be detected. Next, the touch sensitive processing apparatus 130 can calculates distances between the external conductive materials. Accordingly, it can be determined that the distances between the external conductive materials 610A, 610B and 610C are equal. A center or a gravity center of these three approximating or touching events is at the center 530 of the circle. Three adjacent indicating angles between the three approximating or touching positions corresponding to the center 530 of the circle are 120 degrees. And the distances between the center 530 of the circle between the three approximating or touching positions are all the same, i.e., a radius corresponding to the knob 116. Moreover, a distance between the external conductive maternal 510 and the center 530 of the circle is another radius corresponding to the knob 116.

According to a part or all of the mentioned features, the touch sensitive processing apparatus 130 can determine that a knob 116 is positioned at the center 530 of the circle and a designated position 510 corresponding to the knob 116. The touch sensitive processing apparatus 130 may reject the three approximating or touching events corresponding to the three external conductive materials 610A, 610B and 610C. In other words, the touch sensitive processing apparatus 130 does not report these three approximating or touching events but the center of the circle corresponding to the knob 116, a radius of the knob 116 (i.e., a distance between the center of the circle and the designated position), an indicating angle of the designated position, a rotated angle, an angular speed of rotation, and an angular acceleration of rotation etc. Besides, the touch sensitive processing apparatus 130 can set up a corresponding rejection area.

Figure 6B:
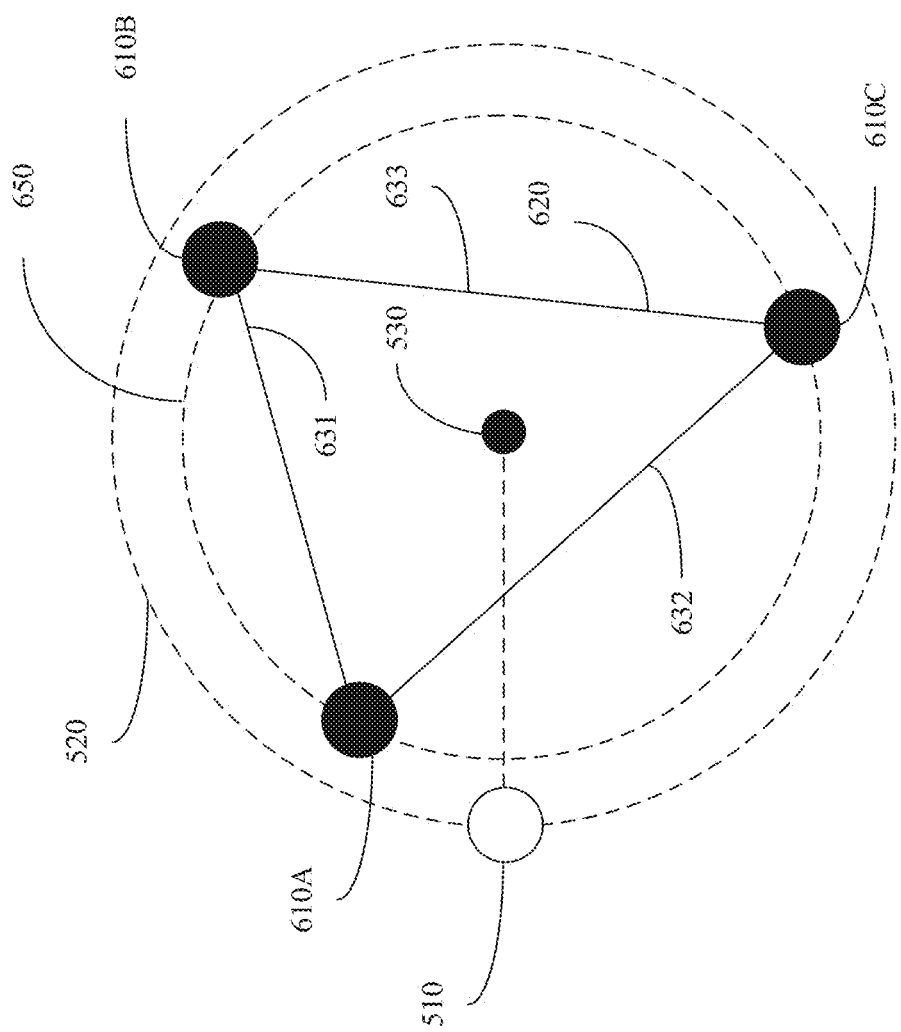
FIG. 6B depicts a diagram of multiple external conductive materials at a bottom surface of a knob in accordance with an embodiment of the present application.

Persons having ordinary skill in the art can understand that the number or the shape of the external conductive materials disposed at the bottom surface of the knob 116 is not required to be as the same as shown in FIG. 6A for the recognition of the knob 116. Please refer to FIG. 6B, which depicts a diagram of multiple external conductive materials at a bottom surface of a knob in accordance with an embodiment of the present application. As shown in FIG. 6B, there are three external conductive materials 610A, 610B and 610C at the bottom surface of the knob 116. These three external conductive materials are at a circumference 650 of another circle. And they form an isosceles triangle.

The touch sensitive processing apparatus 130 can determine that a length of a first edge 631 between the external conductive materials 610A and 610B is different from lengths of the other two edges 632 and 633. The lengths of the edges 632 and 633 are identical. However, a center or a gravity center of these three approximating or touching events is at the center 530 of the circle. And the distances between the center 530 of the circle between the three approximating or touching positions are all the same, i.e., a radius corresponding to the knob 116. Moreover, a distance between the external conductive maternal 510 and the center 530 of the circle is another radius corresponding to the knob 116.

According to a part or all of the mentioned features, the touch sensitive processing apparatus 130 can determine that a knob 116 is positioned at the center 530 of the circle and a designated position 510 corresponding to the knob 116. The touch sensitive processing apparatus 130 may reject the three approximating or touching events corresponding to the three external conductive materials 610A, 610B and 610C. In other words, the touch sensitive processing apparatus 130 does not report these three approximating or touching events but the center of the circle corresponding to the knob 116, a radius of the knob 116 (i.e., a distance between the center of the circle and the designated position), an indicating angle of the designated position, a rotated angle, an angular speed of rotation, and an angular acceleration of rotation etc. Besides, the touch sensitive processing apparatus 130 can set up a corresponding rejection area.

Figure 6C:
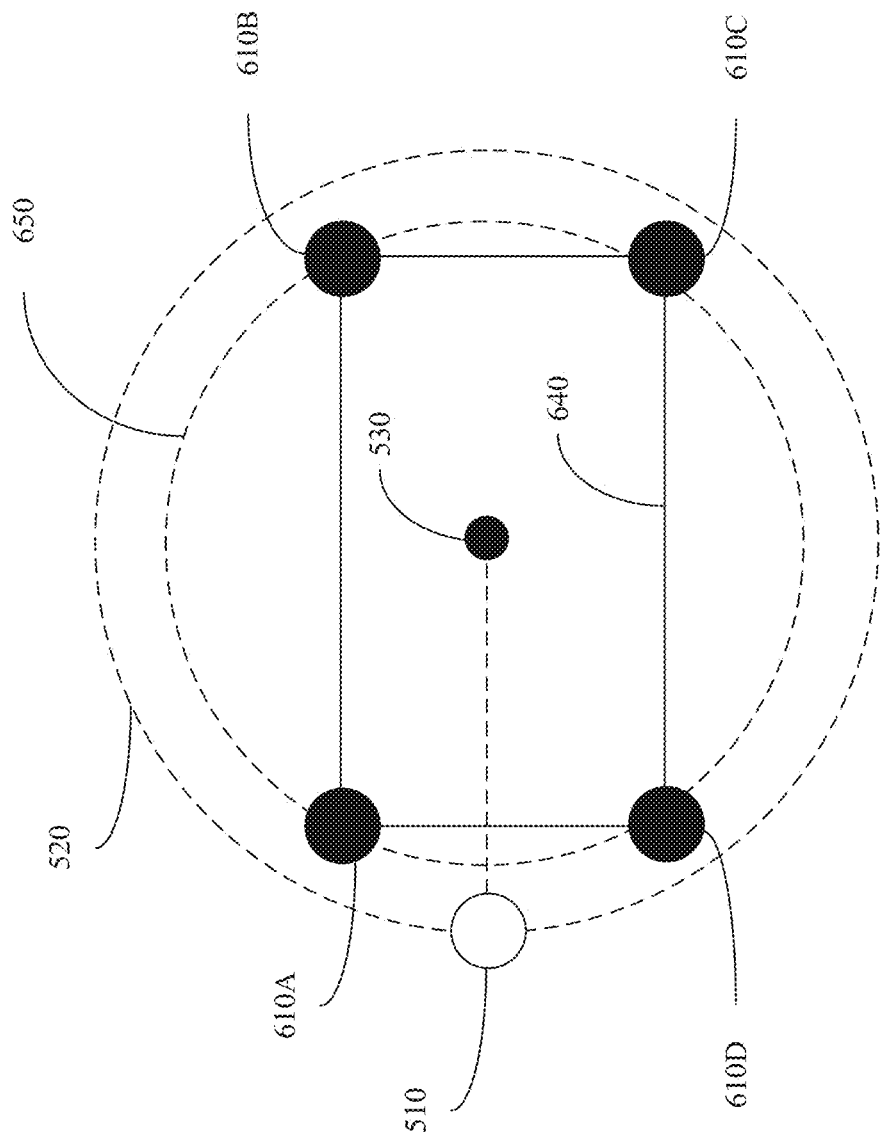
FIG. 6C depicts a diagram of multiple external conductive materials at a bottom surface of a knob in accordance with an embodiment of the present application.

Please refer to FIG. 6C, which depicts a diagram of multiple external conductive materials at a bottom surface of a knob in accordance with an embodiment of the present application. As shown in FIG. 6C, there are four external conductive materials 610A, 610B, 610C, and 610D at the bottom surface of the knob 116. The touch sensitive processing apparatus 130 is able to detect four approximating or touching positions corresponding to the four external conductive materials as four vertices of a rectangle 640. A center or a gravity center of the rectangle 640 is the center 530 of circle corresponding to the knob 116. The distances between the four approximating or touching positions and the center 530 of circle are a known radius of the corresponding knob 116. The four approximating or touching positions are on the circumference 650. A distance between the external conductive material 510 and the center 530 of circle is another known radius of the corresponding knob 116.

According to some or all abovementioned features, the touch sensitive processing apparatus 130 can recognize that there is a knob 116 resides on top of the center 530 of circle and the designated position 510 corresponding to the knob 116. The touch sensitive processing apparatus 130 can reject or exclude four approximating or touching events corresponding to the four external conductive materials 610A, 610B, 610C, and 610D. In other words, the touch sensitive processing apparatus 130 will not report these four approximating or touching events but the center of the circle corresponding to the knob 116, a radius of the knob 116 (i.e., a distance between the center of the circle and the designated position), an indicating angle of the designated position, a rotated angle, an angular speed of rotation, and an angular acceleration of rotation etc. Besides, the touch sensitive processing apparatus 130 can set up a corresponding rejection area.

Persons having ordinary skill in the art can understand that there may be other arrangements corresponding to multiple external conductive materials underlying the knob 116 except for the embodiments as shown in FIGS. 6A through 6C, given that the touch sensitive processing apparatus 130 can detect features of the arrangements and the correspondences between the arrangements and the knob 116.

Figure 7:
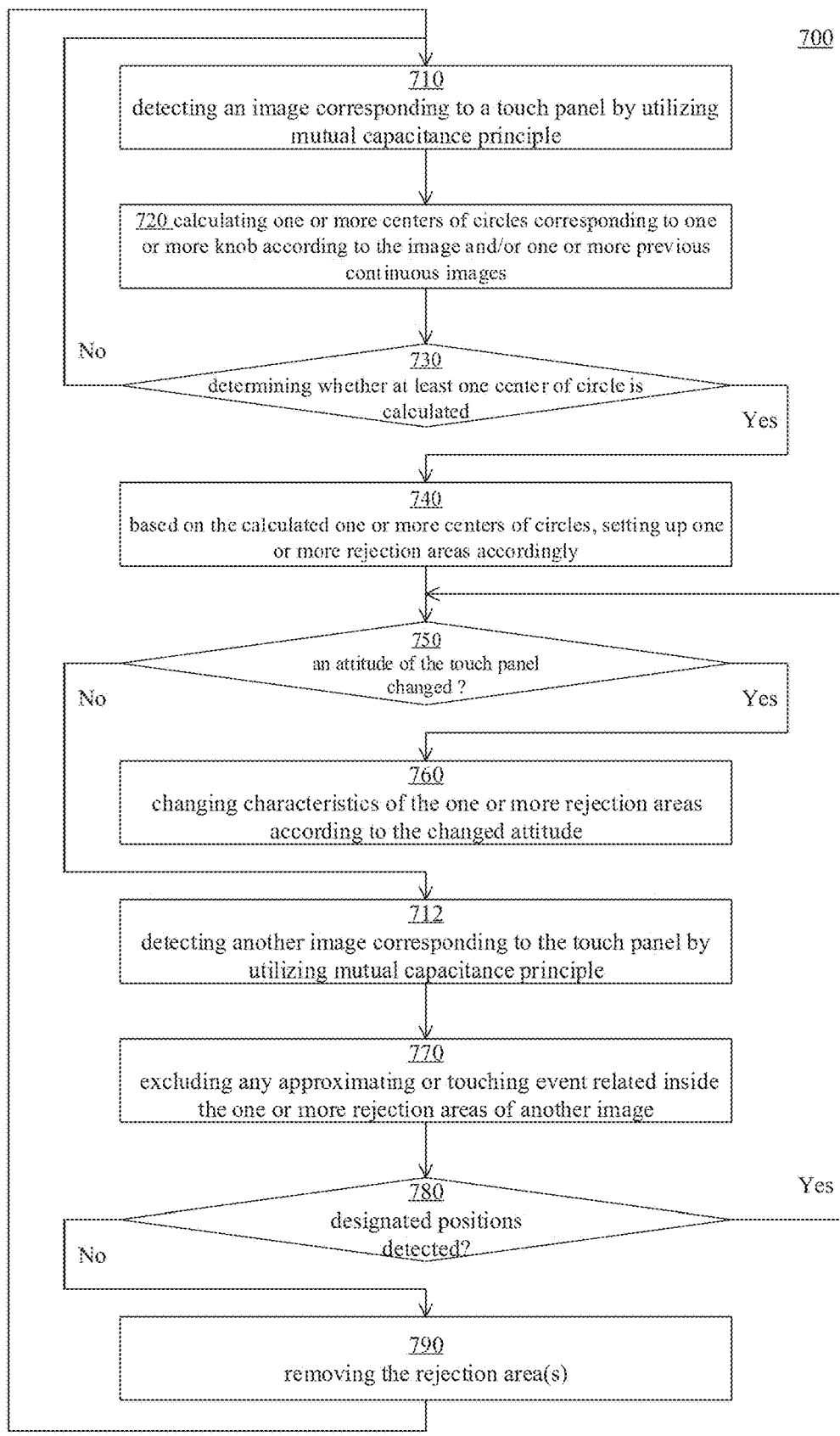
FIG. 7 depicts a flowchart diagram of a touch sensitive processing method in accordance with an embodiment of the present application.

Please refer to FIG. 7, which depicts a flowchart diagram of a touch sensitive processing method in accordance with an embodiment of the present application. The touch sensitive processing method 700 may be realized by the touch sensitive processing apparatus 130 as shown in FIG. 1, especially it may be realized by executing multiple instructions stored in a non-volatile memory by the embedded processor 240 as shown in FIG. 3. The touch sensitive processing method 700 may begin with step 710. If no causal relationship between any two steps is mentioned, the present application does not limit the execution sequence of these two steps.

Step 710: detecting an image corresponding to a touch panel by utilizing mutual capacitance principle.

Step 720: calculating one or more centers of circles corresponding to one or more knob according to the image and/or one or more previous continuous images.

Step 730: determining whether at least one center of circle is calculated. When at least one center of circle can be calculated at step 720, the flow proceeds to step 740. Otherwise, the flow returns to step 710. The image which is already involved in the calculation may be further referred at a new executed step 720.

Step 740: based on the calculated one or more centers of circles, setting up one or more rejection areas accordingly. Next, the flow may proceed to optional step 750 or to step 712.

Optional step 750: determining whether an attitude of the touch panel regarding to the ground is changed. When the attitude is changed, the flow proceeds to step 760. Otherwise, the flow proceeds to step 712.

Optional step 760: changing characteristics of the one or more rejection areas according to the changed attitude, the characteristics may include one or any combination of following: sizes, shapes; and positions of the one or more rejection areas.

Step 712: similar to step 710, detecting another image corresponding to the touch panel by utilizing mutual capacitance principle. Next, the flow may proceed to step 770 or step 780. The present application does not limit the execution sequence of these two steps 770 and 780. These two steps may be currently executed.

Step 770: excluding any approximating or touching event related inside the one or more rejection areas of another image. The excluded approximating or touching event is corresponding to a part of a hand, such as an arm, a wrist, a palm, or a finger.

Step 780: determining whether one or more designated positions corresponding to the one or more centers of circles can be detected. When the one or more designated positions corresponding to the one or more centers of circles can be detected, it implies that the corresponding one or more knobs are still on the touch panel. Thus, the flow may returns to the optional step 750 or to the step 712. When no designated positions are gone, it represents that the one or more knobs are not on the touch panel. Thus, the flow proceeds to step 790.

Step 790: removing the rejection area(s).

According to the touch sensitive processing apparatus, the electronic system and method thereof provided by the present application, a rejection area corresponding to a knob can be quickly set up after the knob is placed on a touch panel or screen by a user such that the user can feel free to manipulate the knob by a hand and no unintentional functions would be triggered accidentally. Besides, the present application can be applied to a special designed or a normal knob.

According to an embodiment of the present application, a touch sensitive processing apparatus is provided. The touch sensitive processing apparatus comprising: an interconnection network configured for connecting multiple touch electrodes of a touch panel, respectively, wherein the touch electrodes include multiple first electrodes in parallel to a first axis and multiple second electrodes in parallel to a second axis; a driving circuit configured for emitting driving signals to one or more of the touch electrodes connected by the interconnection network; a sensing circuit configured for sensing one or more of the touch electrodes connected by the interconnection network; a processor, connected to the interconnection network, the driving circuit, and the sensing circuit, configured for executing instructions stored in a non-volatile memory for: mutual capacitance sensing, by the driving circuit and the sensing circuit, via the touch electrodes to get one or more continuous images of the touch panel; calculating a center of circle corresponding to a knob placed on the touch panel according to the one or more continuous images; and when the center of circle is detected, setting up a rejection area corresponding to the center of circle.

Preferably, in order to save computing resources and time corresponding to touching events, the processor is further configured for ignoring all kinds of approximating or touching events detected in the rejection area after the rejection area is set up.

Preferably, in order to specifically reject touching events related to hands in the rejection area, the processor is further configured for determining whether a touching event detected in the rejection area is related to a part of a hand after the rejection area is set up; and ignoring the touching event detected in the rejection area when the touching event is determined related to a part of a hand.

Preferably, in order to adapt to a knob with a button function, the rejection area does not include an area inside a circumference corresponding to the center of circle corresponding to the knob.

Preferably, in order to remove the rejection area after the knob leaves the touch panel, after the rejection area is set up, the processor is further configured for: mutual capacitance sensing, by the driving circuit and the sensing circuit, via the touch electrodes to get a second image of the touch panel; detecting a second touching event according to the second image, wherein the second touching event is on a circumference corresponding to the center of circle; when the second touching event is detected, maintaining the rejection area; and when the second touching event is not detected, removing the rejection area.

Preferably, in order to adapt to knobs have special arrangements of underlying external conductive materials for quickly setting up rejection areas, when the center of circle is calculated according to exact one of the images, wherein the exact one of the images includes multiple touching events corresponding to the knob, a position of the center of circle is calculated according to the multiple touching events corresponding to the knob.

Preferably, in order to deal with there are a plurality of knobs on the same touch panel or screen, the processor is further configured for: detecting a third touching event in each one of the continuous images; determining whether the third touching events in the continuous images are on a part of a circumference of another circle; and when the third touching events are determined on the part of the circumference of the another circle, setting up a third rejection area corresponding to a center of the another circle.

Preferably, the circle and the another circle are not overlapped.

Preferably, in order to adapt to multiple knobs of a common type on the same touch panel or screen, a radius of the circle is identical to a radius of the another circle.

Preferably, in order to removing the rejection area after the knob leaves the touch panel, the processor is further configured for following after the third rejection area is set: mutual capacitance sensing, by the driving circuit and the sensing circuit, via the touch electrodes to get a second image of the touch panel; detecting a second touching event in the second image, wherein the second touching event is on the circumference of the another circle; when the second touching event is detected, maintaining the third rejection area; and when the second touching event is not detected, removing the third rejection area.

Preferably, in order to adapt to the changed attitude that the user manipulates the knob in response to that the attitude of the touch panel relative to the ground, after the rejection area is set up, the processor is further configured for altering one of following characteristics of the rejection area according to an attitude of the touch panel relative to ground when it is notified that the attitude is changed: a size; a shape; and a position.

According to an embodiment of the present application, an electronic system is provided. The electronic system comprising the touch panel and the touch sensitive processing apparatus.

Preferably, in order to enhance user experience, the electronic system further comprises the knob.

According to one embodiment of the present application, a touch sensitive processing method is provided. The touch sensitive processing method, comprising: mutual capacitance sensing via touch electrodes of a touch panel to get one or more continuous images of the touch panel; calculating a center of circle corresponding to a knob placed on the touch panel according to the one or more continuous images; and when the center of circle is detected, setting up a rejection area corresponding to the center of circle.

Preferably, in order to save computing resources and time corresponding to touching events, the method further comprises ignoring all kinds of approximating or touching events detected in the rejection area after the rejection area is set up.

Preferably, in order to specifically reject touching events related to hands in the rejection area, the touch sensitive processing method further comprises: determining whether a touching event detected in the rejection area is related to a part of a hand after the rejection area is set up; and ignoring the touching event detected in the rejection area when the touching event is determined related to a part of a hand.

Preferably, in order to adapt to a knob with a button function, the rejection area does not include an area inside a circumference corresponding to the center of circle corresponding to the knob.

Preferably, in order to remove the rejection area after the knob leaves the touch panel, after the rejection area is set up, the touch sensitive processing method further comprises: mutual capacitance sensing via the touch electrodes to get a second image of the touch panel; detecting a second touching event according to the second image, wherein the second touching event is on a circumference corresponding to the center of circle; when the second touching event is detected, maintaining the rejection area; and when the second touching event is not detected, removing the rejection area.

Preferably, in order to adapt to knobs have special arrangements of underlying external conductive materials for quickly setting up rejection areas, when the center of circle is calculated according to exact one of the images, wherein the exact one of the images includes multiple touching events corresponding to the knob, a position of the center of circle is calculated according to the multiple touching events corresponding to the knob.

Preferably, in order to deal with there are a plurality of knobs on the same touch panel or screen, the touch sensitive processing method further comprises: detecting a third touching event in each one of the continuous images; determining whether the third touching events in the continuous images are on a part of a circumference of a second circle; and when the third touching events are determined on the part of the circumference of the second circle, setting up a third rejection area corresponding to a center of the second circle.

Preferably, the circle and the second circle are not overlapped.

Preferably, in order to adapt to multiple knobs of a common type on the same touch panel or screen, a radius of the circle is identical to a radius of the second circle.

Preferably, in order to removing the rejection area after the knob leaves the touch panel, the touch sensitive processing method further comprises following steps after the third rejection area is set: mutual capacitance sensing via the touch electrodes to get a second image of the touch panel; detecting a second touching event in the second image, wherein the second touching event is on the circumference of the another circle; when the second touching event is detected, maintaining the third rejection area; and when the second touching event is not detected, removing the third rejection area.

Preferably, in order to adapt to the changed attitude that the user manipulates the knob in response to that the attitude of the touch panel relative to the ground, after the rejection area is set up, the touch sensitive processing method further comprises altering one of following characteristics of the rejection area according to an attitude of the touch panel relative to ground when it is notified that the attitude is changed: a size; a shape; and a position.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing apparatus, comprising:
an interconnection network configured for connecting multiple touch electrodes of a touch panel, respectively, wherein the touch electrodes include multiple first electrodes in parallel to a first axis and multiple second electrodes in parallel to a second axis;
a driving circuit configured for emitting driving signals to one or more of the touch electrodes connected by the interconnection network;
a sensing circuit configured for sensing one or more of the touch electrodes connected by the interconnection network;

a processor, connected to the interconnection network, the driving circuit, and the sensing circuit, configured for executing instructions stored in a non-volatile memory for:
mutual capacitance sensing, by the driving circuit and the sensing circuit, via the touch electrodes to get one or more continuous images of the touch panel;
calculating a center of circle corresponding to a knob placed on the touch panel according to the one or more continuous images;
when the center of circle is detected, setting up a rejection area corresponding to the center of circle;
mutual capacitance sensing after the rejection area is set up, by the driving circuit and the sensing circuit, via the touch electrodes to get a second image of the touch panel;
detecting a second touching event according to the second image, wherein the second touching event is on a circumference corresponding to the center of circle;
when the second touching event is detected, maintaining the rejection area; and
when the second touching event is not detected, removing the rejection area.

2. The touch sensitive processing apparatus of claim 1, wherein the processor is further configured for ignoring all kinds of approximating or touching events detected in the rejection area after the rejection area is set up.

3. The touch sensitive processing apparatus of claim 1, wherein the processor is further configured for:
determining whether a touching event detected in the rejection area is related to a part of a hand after the rejection area is set up; and
ignoring the touching event detected in the rejection area when the touching event is determined related to a part of a hand.

4. The touch sensitive processing apparatus of claim 1, wherein the rejection area does not include an area inside a circumference corresponding to the center of circle corresponding to the knob.

5. The touch sensitive processing apparatus of claim 1, wherein when the center of circle is calculated according to exact one of the images, wherein the exact one of the images includes multiple touching events corresponding to the knob, a position of the center of circle is calculated according to the multiple touching events corresponding to the knob.

6. The touch sensitive processing apparatus of claim 1, wherein the processor is further configured for:
detecting a third touching event in each one of the continuous images;
determining whether the third touching events in the continuous images are on a part of a circumference of another circle; and
when the third touching events are determined on the part of the circumference of the another circle, setting up a third rejection area corresponding to a center of the another circle.

7. The touch sensitive processing apparatus of claim 6, wherein the circle and the another circle are not overlapped.

8. The touch sensitive processing apparatus of claim 6, wherein a radius of the circle is identical to a radius of the another circle.

9. The touch sensitive processing apparatus of claim 6, wherein the processor is further configured for following after the third rejection area is set:
mutual capacitance sensing, by the driving circuit and the sensing circuit, via the touch electrodes to get a second image of the touch panel;
detecting a second touching event in the second image, wherein the second touching event is on the circumference of the another circle;
when the second touching event is detected, maintaining the third rejection area; and
when the second touching event is not detected, removing the third rejection area.

10. The touch sensitive processing apparatus of claim 1, wherein after the rejection area is set up, the processor is further configured for altering one of following characteristics of the rejection area according to an attitude of the touch panel relative to ground when it is notified that the attitude is change
a size;
a shape; and
a position.

11. An electronic system, comprising the touch panel and the touch sensitive processing apparatus of claim 1.

12. The electronic system of claim 11, further comprises the knob.

13. A touch sensitive processing method, comprising:
mutual capacitance sensing via touch electrodes of a touch panel to get one or more continuous images of the touch panel;
calculating a center of circle corresponding to a knob placed on the touch panel according to the one or more continuous images; and
when the center of circle is detected, setting up a rejection area corresponding to the center of circle;
mutual capacitance sensing, after the rejection area is set up, via the touch electrodes to get a second image of the touch panel;
detecting a second touching event according to the second image, wherein the second touching event is on a circumference corresponding to the center of circle;
when the second touching event is detected, maintaining the rejection area; and
when the second touching event is not detected, removing the rejection area.

14. The touch sensitive processing method of claim 13, further comprises ignoring all kinds of approximating or touching events detected in the rejection area after the rejection area is set up.

15. The touch sensitive processing method of claim 13, further comprises determining whether a touching event detected in the rejection area is related to a part of a hand after the rejection area is set up; and ignoring the touching event detected in the rejection area when the touching event is determined related to a part of a hand.

16. The touch sensitive processing method of claim 13, wherein the rejection area does not include an area inside a circumference corresponding to the center of circle corresponding to the knob.

17. The touch sensitive processing method of claim 13, wherein when the center of circle is calculated according to exact one of the images, wherein the exact one of the images includes multiple touching events corresponding to the knob, a position of the center of circle is calculated according to the multiple touching events corresponding to the knob.

18. The touch sensitive processing method of claim 13, further comprises:
detecting a third touching event in each one of the continuous images;

determining whether the third touching events in the continuous images are on a part of a circumference of a second circle; and when the third touching events are determined on the part of the circumference of the second circle, setting up a third rejection area corresponding to a center of the second circle.

19. The touch sensitive processing method of claim 18, wherein the circle and the second circle are not overlapped.

20. The touch sensitive processing method of claim 18, wherein a radius of the circle is identical to a radius of the second circle.

21. The touch sensitive processing method of claim 18, further comprises following steps after the third rejection area is set:

mutual capacitance sensing via the touch electrodes to get a second image of the touch panel;

detecting a second touching event in the second image, wherein the second touching event is on the circumference of the another circle;

when the second touching event is detected, maintaining the third rejection area; and when the second touching event is not detected, removing the third rejection area.

22. The touch sensitive processing method of claim 13, wherein after the rejection area is set up, the touch sensitive processing method further comprises altering one of following characteristics of the rejection area according to an attitude of the touch panel relative to ground when it is notified that the attitude is changed:

a size;
a shape; and
a position.

* * * * *